United States Patent
Zhang et al.

(10) Patent No.: US 12,497,297 B2
(45) Date of Patent: Dec. 16, 2025

(54) MESHED CATALYST BASED HIGH-YIELD PREPARATION AND REGENERATION METHOD FOR CARBON NANOTUBES AND HYDROGEN

(71) Applicant: SOUTHEAST UNIVERSITY, Nanjing (CN)

(72) Inventors: Huiyan Zhang, Nanjing (CN); Dongyang Jiang, Nanjing (CN); Qingyu Liu, Nanjing (CN); Ru Hong, Nanjing (CN); Bo Peng, Nanjing (CN); Rui Xiao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/013,285

(22) PCT Filed: Apr. 27, 2022

(86) PCT No.: PCT/CN2022/089543
§ 371 (c)(1),
(2) Date: Dec. 28, 2022

(87) PCT Pub. No.: WO2023/087623
PCT Pub. Date: May 25, 2023

(65) Prior Publication Data
US 2024/0101428 A1    Mar. 28, 2024

(30) Foreign Application Priority Data
Nov. 16, 2021   (CN) .......................... 202111351683.1

(51) Int. Cl.
*C01B 32/162* (2017.01)
*B01J 23/86* (2006.01)
(Continued)

(52) U.S. Cl.
CPC .......... *C01B 32/162* (2017.08); *B01J 23/862* (2013.01); *B01J 23/94* (2013.01); *C01B 3/26* (2013.01);
(Continued)

(58) Field of Classification Search
CPC . C01B 32/162; C01B 3/26; C01B 2203/0277; C01B 2203/06; B01J 23/745; B01J 23/862
See application file for complete search history.

(56) References Cited

U.S. PATENT DOCUMENTS

2001/0031900 A1* 10/2001 Margrave ............... B82Y 40/00
530/350
2012/0219489 A1* 8/2012 Levendis ................ C01B 32/16
977/843
(Continued)

FOREIGN PATENT DOCUMENTS

CN     110010907    *  7/2019   .......... H01M 4/8647
JP     2006316158   * 11/2006   .............. C08F 10/00

*Primary Examiner* — Anthony J Zimmer
*Assistant Examiner* — Eric Scott Sherman
(74) *Attorney, Agent, or Firm* — CBM PATENT CONSULTING, LLC

(57) ABSTRACT

A meshed catalyst based high-yield preparation and regeneration method for carbon nanotubes and hydrogen includes the following steps: step one, adding waste plastic into a low-temperature pyrolysis section, conducting slow heating, and continuously introducing nitrogen; step two, using a multilayer stainless steel mesh obtained through laminated pressing and vacuum sintering as a catalyst, introducing the volatiles into a high-temperature catalytic section, conducting a catalytic reaction under the action of a meshed stainless steel catalyst obtained through acid etching and calcination pretreatment, generating the carbon nanotubes on a surface of the catalyst, and meanwhile generating high-purity hydrogen; and step three, after temperature drop, conducting (Continued)

ultrasonic treatment on a stainless steel mesh after the reaction, achieving physical stripping of the carbon nanotubes from the stainless steel mesh, then placing the stainless steel mesh subjected to secondary calcination in a system for recycling, and regenerating the carbon nanotubes and the hydrogen.

8 Claims, 3 Drawing Sheets

(51) Int. Cl.
- *B01J 23/94* (2006.01)
- *B82Y 40/00* (2011.01)
- *C01B 3/26* (2006.01)

(52) U.S. Cl.
CPC ....... *B82Y 40/00* (2013.01); *C01B 2203/0277* (2013.01); *C01B 2203/06* (2013.01); *C01B 2203/1023* (2013.01); *C01B 2203/1047* (2013.01); *C01B 2203/1235* (2013.01)

(56) References Cited

U.S. PATENT DOCUMENTS

| | | | |
|---|---|---|---|
| 2017/0029634 A1* | 2/2017 | Hao | C01B 32/174 |
| 2023/0106811 A1* | 4/2023 | Levendis | C01B 32/162 |
| | | | 423/447.1 |

* cited by examiner

MESHED CATALYST BASED HIGH-YIELD PREPARATION AND REGENERATION METHOD FOR CARBON NANOTUBES AND HYDROGEN

TECHNICAL FIELD

The present disclosure belongs to the field of organic solid waste utilization, and particularly relates to a catalyst based preparation and regeneration method for carbon nanotubes and hydrogen with waste plastic as a raw material.

BACKGROUND ART

Plastic brings both convenience and various environmental problems to human society. The problems include soil pollution, marine microplastic pollution, etc. According to statistics, in 2018, China output 60.42 million tons of plastic products, but only recycled 15.74 million tons of waste plastic, accounting for about 26%. Plastic is considered to be one of the most difficult substances to degrade in nature. More than 60% of waste plastic in the world is treated through extensive incineration and landfill, which can cause considerable water, air and soil pollution and land occupation problems. Especially, microplastic particles are easily ingested by marine organisms, and then invade the marine ecosystem and the whole food chain including human beings, seriously endangering health.

In recent years, the technology of co-production of high-value carbon materials and hydrogen through catalytic pyrolysis has obvious advantages in terms of technological advancement and process economy, thus gradually becoming a topic of widespread concern among scholars. Carbon materials are widely used in fields of adsorption, separation, catalysis, energy storage and environmental management, and hydrogen energy, as the most promising clean energy in the 21st century, is an inevitable choice for future energy development of the world. Therefore, achieving, based on producing clean energy, high value-added utilization of plastics to the maximum extent is an important direction to achieve resource utilization of waste plastic currently. With introduction of mandatory waste sorting measures in China in 2019, a recycling rate of waste plastic will be greatly improved, and its resource utilization will contribute to promotion of China's sustainable development strategy. Achieving harmless and cyclic utilization of carbon resources at the same time is an important technical means to achieve carbon neutrality.

Transition metal Fe, Co, or Ni based catalysts have desirable catalytic activity for extracting carbon nanotubes from hydrocarbon gas, and have been widely studied at present. Preparation of powder-like catalysts depends on high-cost technical means such as coprecipitation, impregnation or a sol-gel method. Regardless of types and preparation methods of catalysts, catalyst particles and catalyst carriers distributed in carbon nanotubes must be removed if high-purity carbon nanotubes are to be obtained. In large-scale industrial application, the main technology for purifying carbon nanotubes depends on selective oxidation chemical processes of various oxidants, which has some problems such as high energy consumption and complicated post-treatment. At present, many researches focus on powdered transition metal catalysts, but their industrial application is still limited by high preparation cost, complicated separation processes and difficult purification. Therefore, it is particularly important to develop a system and method with low cost, a simple separation process, high product purity and easy-to-recycle catalysts in a process of organic solid waste pyrolysis-catalytic co-production of high-value carbon nanotubes and hydrogen.

SUMMARY

In order to overcome defects in the prior art and satisfy improvement requirements, the present disclosure provides a meshed catalyst based high-yield preparation and regeneration method for carbon nanotubes and hydrogen. The method may effectively reduce cost of preparation of catalysts and purification of carbon nanotube products, improve yields of carbon nanotubes and hydrogen, and then recycle catalysts and regenerate products.

Technical solution: a meshed stainless steel catalyst based co-production and regeneration method for carbon nanotubes and hydrogen with waste plastic as a raw material of the present disclosure includes the following steps:

step one, placing the raw material of the waste plastic in a pyrolysis section, conducting slow heating to reach a set pyrolysis temperature, holding the temperature for a certain time, and continuously introducing nitrogen or inert gas in the process, such that the plastic is subjected to a pyrolysis reaction to generate volatiles;

step two, introducing the volatiles into a high-temperature catalytic section kept at a catalytic temperature, conducting a catalytic reaction under the action of a meshed stainless steel catalyst, generating carbon nanotubes on a surface of the catalyst, and meanwhile generating high-purity hydrogen; and step three, after cooling and temperature drop, placing the meshed catalyst after the reaction in an ethanol solution for repeated ultrasonic treatment, collecting, by a suction filtration device, the carbon nanotubes dispersed in the ethanol solution, and meanwhile, returning the catalyst to a high-temperature section for reaction again, so as to regenerate the carbon nanotubes and the hydrogen.

Furthermore, in step one, the waste plastic is pulverized in advance to be powder having a particle size of 30 meshes-200 meshes, and types of the plastic include low density polyethylene (LDPE), high density polyethylene (HDPE), polypropylene (PP), general-purpose polystyrene (GPPS), and high impact polystyrene (HIPS).

Furthermore, in step one, a pyrolysis heating rate of the waste plastic is 10° C./min-20° C./min, a final temperature range is 500° C.-600° C., holding time is 10 min-20 min, and a pyrolysis reactor is a fixed bed reactor.

Furthermore, in step one, a system uses one or more gases of nitrogen, helium and argon as the carrier gas, and a flow rate of the carrier gas is 50 mL/min-200 mL/min.

Furthermore, in step two, a catalytic deposition temperature of the meshed stainless steel catalyst for growing the carbon nanotubes is 700° C.-900° C., and a catalytic reactor is a fixed bed reactor.

Furthermore, in step two, five layers of 304 or 316 stainless steel sintered meshes having high temperature resistance are used as the catalyst, and the stainless steel meshes are pretreated through acid etching or air calcination, such that a surface structure having high roughness is formed.

Furthermore, in step three, ultrasonic frequency of an ultrasonic cleaner for separating the carbon nanotubes from the stainless steel mesh is 40 kHz-100 kHz, and ultrasonic treatment is conducted 5 times-10 times, each time lasting 10 min-30 min.

Furthermore, in step three, after the carbon nanotubes are separated from the stainless steel mesh, the meshed stainless steel catalyst is cleaned and dried for recycling.

Beneficial effects: In the solution, catalytic pyrolysis of the waste plastic involves a low-temperature pyrolysis section and the high-temperature catalytic section, such that energy consumption may be reduced through low-temperature pyrolysis, and moreover, high-efficiency catalytic performance of the meshed catalyst may be achieved in the high-temperature section. The treated stainless steel mesh is used as the catalyst in the high-temperature section, such that preparation cost of the catalyst may be reduced, pyrolysis gas may fully flow through meshed channels, and conversion efficiency of the waste plastic into the carbon nanotubes and the hydrogen is improved. In addition, compared with a traditional method, the carbon nanotubes obtained through ultrasonic separation contain less metal particles and have higher purity. The separated stainless steel mesh may be directly returned to the high-temperature section for recycling, such that the carbon nanotubes and the hydrogen are regenerated, and economy of the system is greatly improved.

DETAILED DESCRIPTION OF THE EMBODIMENTS

Figure 1:
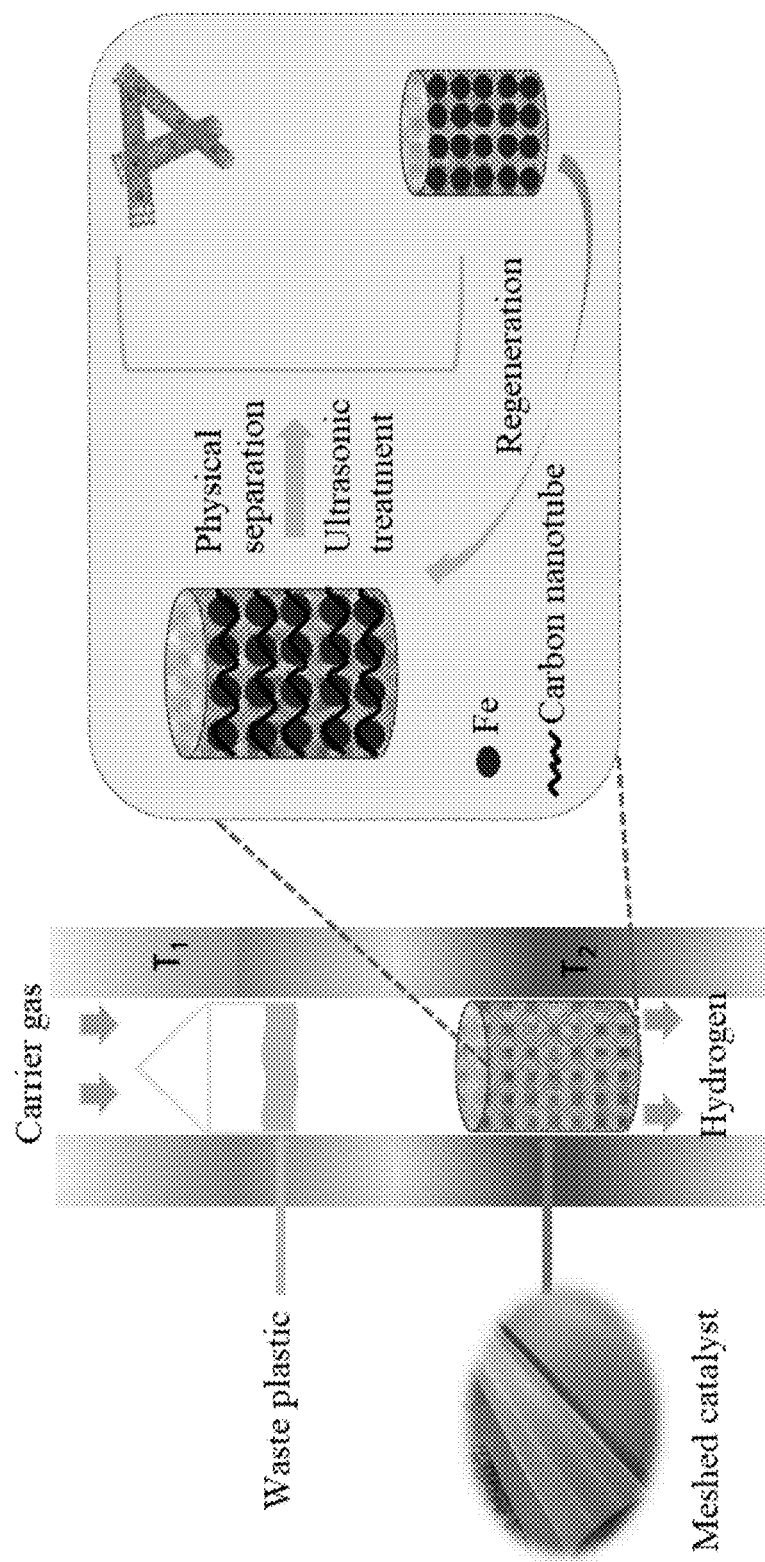
FIG. 1 is a schematic diagram of the whole system of the present disclosure.

The present disclosure provides a meshed stainless steel catalyst based co-production and regeneration method for carbon nanotubes and hydrogen. The method included the following steps that waste plastic was added into a low-temperature pyrolysis section and slowly heated, and nitrogen was continuously introduced, such that the plastic was subjected to a pyrolysis reaction to generate volatiles; then, a multilayer stainless steel mesh obtained through laminated pressing and vacuum sintering was used as a catalyst, the volatiles were introduced into a high-temperature catalytic section, a catalytic reaction was conducted under the action of a meshed stainless steel catalyst obtained through acid etching and calcination pretreatment, carbon nanotubes were generated on a surface of the catalyst, and meanwhile high-purity hydrogen was generated; and finally, after temperature drop, ultrasonic treatment was conducted on a stainless steel mesh after the reaction, physical stripping of the carbon nanotubes from the stainless steel mesh was achieved, then the dried stainless steel mesh was placed in a system for recycling, and the carbon nanotubes and the hydrogen were regenerated. The whole reaction process is as shown in FIG. 1. For making objectives, technical solutions and effects of the present disclosure clearer, the solutions will be further described with reference to the following examples. Specific examples described in the present disclosure are merely used to explain the present disclosure, instead of limiting the present disclosure.

Figure 2:
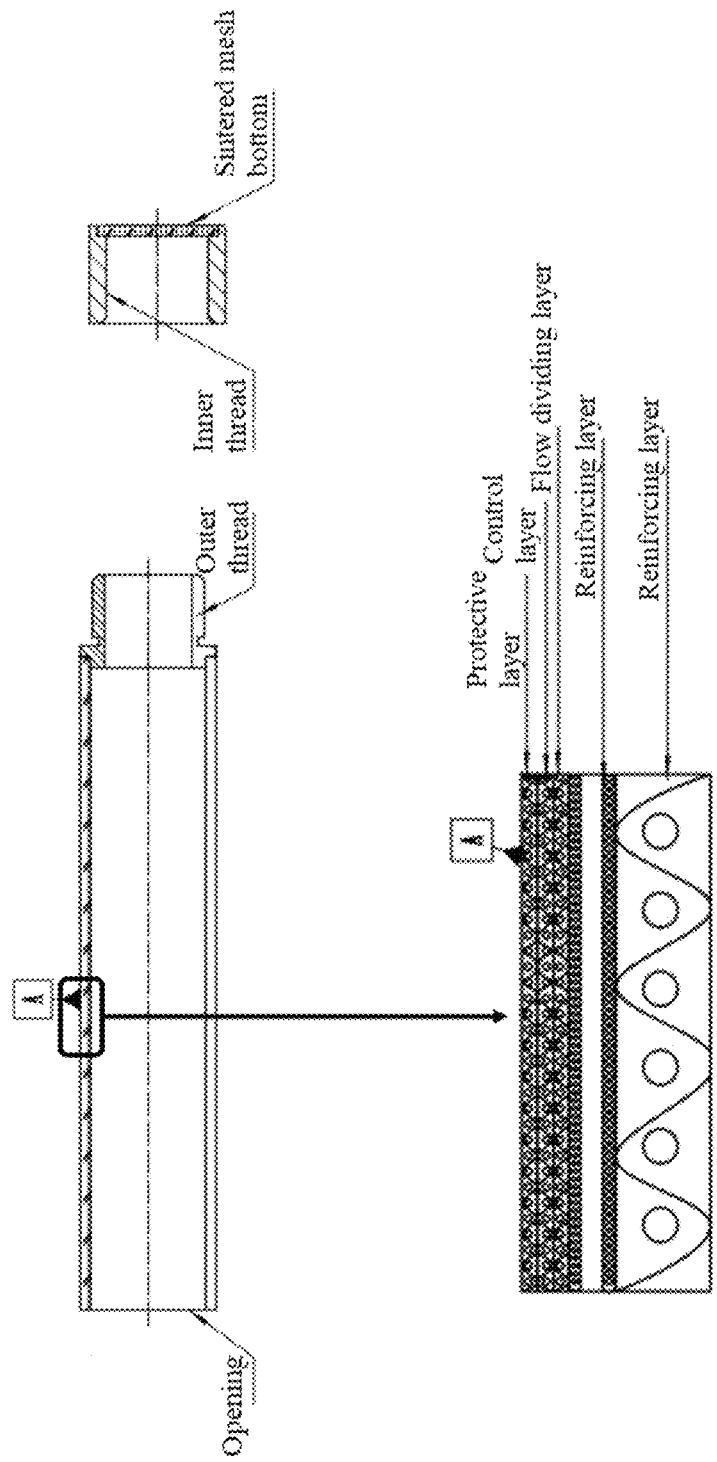
FIG. 2 is a schematic structural diagram of a meshed stainless steel catalyst of the present disclosure.
Figure 3:
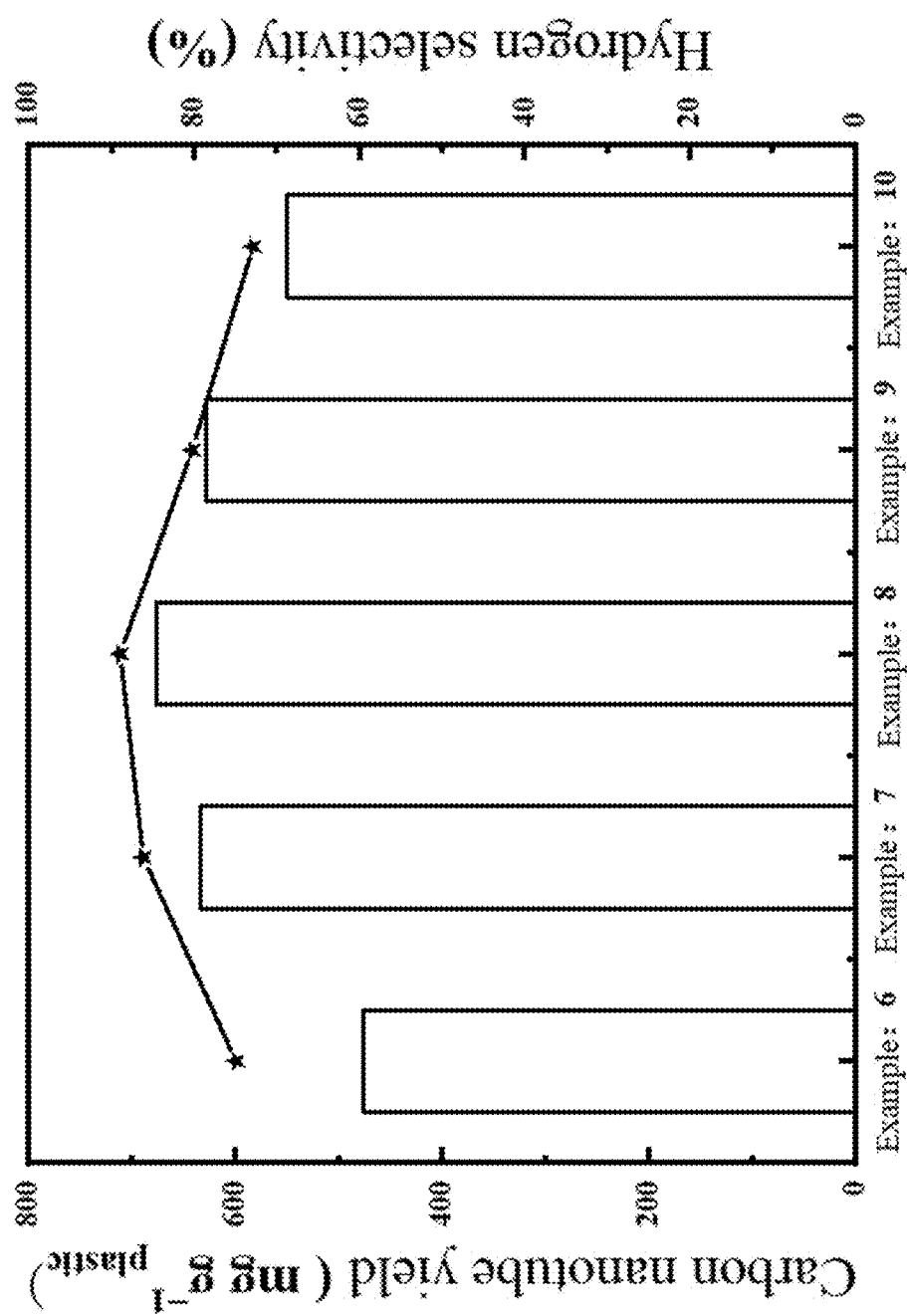
FIG. 3 shows regeneration effects of carbon nanotubes and hydrogen in Examples 6-10 of the present disclosure.

Example 1 Structure and Working Principle of Meshed Stainless Steel Catalyst As shown in FIG. 2, a meshed stainless steel catalyst is formed by conducting laminated pressing and vacuum sintering on five layers of stainless steel meshes, such that overall strength and rigidity are ensured, and the catalyst is suitable for a high-temperature environment in the method. The five layers include a protective layer, a control layer, a flow dividing layer, and two reinforcing layers. A multilayer structure ensures strength of the meshed stainless steel catalyst, and meanwhile, facilitates full contact between pyrolysis gas and a stainless steel layer in a catalytic process. The meshed stainless steel catalyst is designed as a cylinder having an outer diameter of 15 mm and a length of 10 cm, one side of the cylinder is open, and the other side of the cylinder is provided with a detachable stainless steel mesh bottom, such that the carbon nanotubes may be conveniently separated from the catalyst in a subsequent ultrasonic process. In a working process, one side of an opening faces an air flow, and the pyrolysis gas of the plastic fully flows through inner and outer wall surfaces of the meshed stainless steel catalyst along with carrier gas, and hydrogen transfer, dehydrogenation, cyclization, isomerization and other processes of hydrocarbon molecules rapidly occur under the action of the catalyst, and finally the carbon nanotubes grow on the surface of the stainless steel catalyst, and meanwhile, a large amount of hydrogen is produced at the same time.

Example 2

Step one, low density polyethylene (LDPE) plastic powder purchased from Dongguan Zhonglian Plastic and Chemical Technology Co., Ltd. was selected, and was dried in an air dry oven at 105° C. for 12 h, and particles of 80 meshes-100 meshes were screened. 1 g of LDPE was added into a pyrolysis section of a two-section fixed bed, and nitrogen was introduced as carrier gas at a flow rate of 50 mL/min. The pyrolysis section was preheated to 300° C., and then was heated to 500° C. at a heating rate of 10° C./min, and the temperature was held for 20 min. Plastic was subjected to a pyrolysis reaction to generate volatiles, and converted into plastic pyrolysis gas.

Step two: five layers of 316 stainless steel sintered meshes having high temperature resistance were selected as a catalyst, and the stainless steel meshes were placed in 1 M of hydrochloric acid for 12 h for acid etching pretreatment, and then calcined in air at 750° C. for 15 min, so as to complete pretreatment. The meshed stainless steel catalyst was placed in the high-temperature catalytic section and heated to 800° C. The nitrogen carrier gas drove the plastic pyrolysis gas generated in the pyrolysis section to be continuously introduced into the high-temperature catalytic section, fully flow through a stainless steel mesh channel, and have a catalytic reaction on a surface of the mesh, so as to generate carbon nanotubes, and meanwhile, a gas sampling bag connected to a gas outlet was opened to collect gas products. After 20 min of catalytic deposition, the reaction was finished, then a heating device and the gas sampling bag were closed, such that the catalyst and carbon nanotube products were naturally cooled to a room temperature.

Step three, the cooled meshed catalyst was taken out, the catalyst before and after the reaction was weighed, and a difference between weights of the catalyst before and after the reaction was a yield of the carbon nanotubes generated, a result being 594.0 mg/g plastic. The meshed stainless steel catalyst was placed in an ethanol solution and separated in a 40 kHz ultrasonic device. After five times of ultrasonic treatment of 15 min-20 min, the carbon nanotubes grown on a surface of a stainless steel mesh were basically completely separated and dispersed in the ethanol solution. The carbon nanotubes dispersed in the ethanol solution were collected by a suction filtration device. After separation, the catalyst was dried and returned to a high-temperature section for reaction again, such that the carbon nanotubes and the hydrogen were regenerated.

The collected gas products were quantitatively analyzed by a gas chromatography analyzer, and results indicated that a hydrogen yield reached 42.83 mmol/g plastic.

Example 3

Step one, general-purpose polystyrene (GPPS) plastic powder purchased from Dongguan Zhonglian Plastic and Chemical Technology Co., Ltd. was selected, and was dried in an air dry oven at 105° C. for 12 h, and particles of 80 meshes-100 meshes were screened. 1 g of GPPS was added into a pyrolysis section of a two-section fixed bed, and nitrogen was introduced as carrier gas at a flow rate of 50 mL/min. The pyrolysis section was preheated to 300° C., and then was heated to 500° C. at a heating rate of 10° C./min, and the temperature was held for 20 min. Plastic was subjected to a pyrolysis reaction to generate volatiles, and converted into plastic pyrolysis gas.

Step two, a pretreatment mode of a catalyst and parameter settings of a high-temperature catalytic section were the same as those in Example 1.

Step three, a separation and collection method for carbon nanotubes was the same as that in Example 1. Results indicated that a yield of the carbon nanotubes was 789.7 mg/g plastic.

The collected gas products were quantitatively analyzed by a gas chromatography analyzer, and results indicated that a hydrogen yield reached 27.21 mmol/g plastic.

Example 4

Step one, high density polyethylene (HDPE) plastic powder purchased from Yancheng Mingjin Plastic Product Co., Ltd. was selected, and was dried in an air dry oven at 105° C. for 12 h, and particles of 80 meshes-100 meshes were screened. 1 g of HDPE was added into a pyrolysis section of a two-section fixed bed, and nitrogen was introduced as carrier gas at a flow rate of 50 mL/min. The pyrolysis section was preheated to 300° C., and then was heated to 500° C. at a heating rate of 10° C./min, and the temperature was held for 20 min. Plastic was subjected to a pyrolysis reaction to generate volatiles, and converted into plastic pyrolysis gas.

Step two, a pretreatment mode of a catalyst and parameter settings of a high-temperature catalytic section were the same as those in Example 1.

Step three, a separation and collection method for carbon nanotubes was the same as that in Example 1. Results indicated that a yield of the carbon nanotubes was 640.8 mg/g plastic.

The collected gas products were quantitatively analyzed by a gas chromatography analyzer, and results indicated that a hydrogen yield reached 46.44 mmol/g plastic.

Example 5

Step one, high impact polystyrene (HIPS) plastic powder purchased from Yancheng Mingjin Plastic Product Co., Ltd. was selected, and was dried in an air dry oven at 105° C. for 12 h, and particles of 80 meshes-100 meshes were screened. 1 g of HIPS was added into a pyrolysis section of a two-section fixed bed, and nitrogen was introduced as carrier gas at a flow rate of 50 mL/min. The pyrolysis section was preheated to 300° C., and then was heated to 500° C. at a heating rate of 10° C./min, and the temperature was held for 20 min. Plastic was subjected to a pyrolysis reaction to generate volatiles, and converted into plastic pyrolysis gas.

Step two, a pretreatment mode of a catalyst and parameter settings of a high-temperature catalytic section were the same as those in Example 1.

Step three, a separation and collection method for carbon nanotubes was the same as that in Example 1. Results indicated that a yield of the carbon nanotubes was 809.4 mg/g plastic.

The collected gas products were quantitatively analyzed by a gas chromatography analyzer, and results indicated that a hydrogen yield reached 28.36 mmol/g plastic.

Example 6

Step one, polypropylene (PP) plastic powder purchased from Dongguan Zhonglian Plastic and Chemical Technology Co., Ltd. was selected, and was dried in an air dry oven at 105° C. for 12 h, and particles of 120 meshes-160 meshes were screened. 1 g of PP was added into a pyrolysis section of a two-section fixed bed, and nitrogen was introduced as carrier gas at a flow rate of 50 mL/min. The pyrolysis section was preheated to 300° C., and then was heated to 500° C. at a heating rate of 10° C./min, and the temperature was held for 20 min. Plastic was subjected to a pyrolysis reaction to generate volatiles, and converted into plastic pyrolysis gas.

Step two, a pretreatment mode of a catalyst and parameter settings of a high-temperature catalytic section were the same as those in Example 1.

Step three, a separation and collection method for carbon nanotubes was the same as that in Example 1. Results indicated that a yield of the carbon nanotubes was 475.6 mg/g plastic.

The collected gas products were quantitatively analyzed by a gas chromatography analyzer, and results indicated that a hydrogen yield reached 46.02 mmol/g plastic.

Example 7

Step one, raw material selection and pyrolysis section parameter settings were the same as those in Example 5.

Step two, the catalyst after separation in Example 5 was dried, was placed in a high-temperature catalytic section, and was heated to 800° C. The nitrogen carrier gas drove the plastic pyrolysis gas generated in the pyrolysis section to be continuously introduced into the high-temperature catalytic section, fully flow through a stainless steel mesh channel, and have a catalytic reaction on a surface of the mesh, so as to generate carbon nanotubes, and meanwhile, a gas sampling bag connected to a gas outlet was opened to collect gas products. After 20 min of catalytic deposition, the reaction was finished, then a heating device and the gas sampling bag were closed, such that the catalyst and carbon nanotube products were naturally cooled to a room temperature.

Step three, a separation and collection method for carbon nanotubes was the same as that in Example 1. Results indicated that a yield of the carbon nanotubes was 634.2 mg/g plastic.

The collected gas products were quantitatively analyzed by a gas chromatography analyzer, and results indicated that a hydrogen yield reached 47.47 mmol/g plastic.

Example 8

Step one, raw material selection and pyrolysis section parameter settings were the same as those in Example 5.

Step two, the catalyst after separation in Example 6 was dried, was placed in a high-temperature catalytic section, and was heated to 800° C. The nitrogen carrier gas drove the plastic pyrolysis gas generated in the pyrolysis section to be continuously introduced into the high-temperature catalytic section, fully flow through a stainless steel mesh channel, and have a catalytic reaction on a surface of the mesh, so as to generate carbon nanotubes, and meanwhile, a gas sampling bag connected to a gas outlet was opened to collect gas products. After 20 min of catalytic deposition, the reaction was finished, then a heating device and the gas sampling bag were closed, such that the catalyst and carbon nanotube products were naturally cooled to a room temperature.

Step three, a separation and collection method for carbon nanotubes was the same as that in Example 1. Results indicated that a yield of the carbon nanotubes was 676.6 mg/g plastic.

The collected gas products were quantitatively analyzed by a gas chromatography analyzer, and results indicated that a hydrogen yield reached 51.26 mmol/g plastic.

Example 9

Step one, raw material selection and pyrolysis section parameter settings were the same as those in Example 5.

Step two, the catalyst after separation in Example 7 was dried, was placed in a high-temperature catalytic section, and was heated to 800° C. The nitrogen carrier gas drove the plastic pyrolysis gas generated in the pyrolysis section to be continuously introduced into the high-temperature catalytic section, fully flow through a stainless steel mesh channel, and have a catalytic reaction on a surface of the mesh, so as to generate carbon nanotubes, and meanwhile, a gas sampling bag connected to a gas outlet was opened to collect gas products. After 20 min of catalytic deposition, the reaction was finished, then a heating device and the gas sampling bag were closed, such that the catalyst and carbon nanotube products were naturally cooled to a room temperature.

Step three, a separation and collection method for carbon nanotubes was the same as that in Example 1. Results indicated that a yield of the carbon nanotubes was 550.2 mg/g plastic.

The collected gas products were quantitatively analyzed by a gas chromatography analyzer, and results indicated that a hydrogen yield reached 40.63 mmol/g plastic.

Example 10

Step one, raw material selection and pyrolysis section parameter settings were the same as those in Example 5.

Step two, the catalyst after separation in Example 8 was dried, was placed in a high-temperature catalytic section, and was heated to 800° C. The nitrogen carrier gas drove the plastic pyrolysis gas generated in the pyrolysis section to be continuously introduced into the high-temperature catalytic section, fully flow through a stainless steel mesh channel, and have a catalytic reaction on a surface of the mesh, so as to generate carbon nanotubes, and meanwhile, a gas sampling bag connected to a gas outlet was opened to collect gas products. After 20 min of catalytic deposition, the reaction was finished, then a heating device and the gas sampling bag were closed, such that the catalyst and carbon nanotube products were naturally cooled to a room temperature.

Step three, a separation and collection method for carbon nanotubes was the same as that in Example 1. Results indicated that a yield of the carbon nanotubes was 634.2 mg/g plastic.

The collected gas products were quantitatively analyzed by a gas chromatography analyzer, and results indicated that a hydrogen yield reached 47.47 mmol/g plastic.

Example 11

Step one, PP plastic powder purchased from Dongguan Zhonglian Plastic and Chemical Technology Co., Ltd. was selected, and was dried in an air dry oven at 105° C. for 12 h, and particles of 120 meshes-160 meshes were screened. Nitrogen was introduced as carrier gas at a flow rate of 50 mL/min. A pyrolysis section of a two-section fixed bed was rapidly heated to 600° C. at a heating rate of 30° C./min. In this case, 1 g of PP was added into the pyrolysis section, and the temperature was held for 20 min. Plastic was rapidly subjected to a pyrolysis reaction to generate volatiles, and converted into plastic pyrolysis gas.

Step two, a pretreatment mode of a catalyst and parameter settings of a high-temperature catalytic section were the same as those in Example 1.

Step three, a separation and collection method for carbon nanotubes was the same as that in Example 1. Results indicated that a yield of the carbon nanotubes was 534.0 mg/g plastic.

The collected gas products were quantitatively analyzed by a gas chromatography analyzer, and results indicated that a hydrogen yield reached 37.12 mmol/g plastic.

Comparative Example 1

Step one, raw material selection and pyrolysis section parameter settings were the same as those in Example 1.

Step two, no catalyst was added, and only a temperature of 800° C. may be input in a high-temperature catalytic section. The nitrogen carrier gas drove plastic pyrolysis gas generated in a pyrolysis section to be continuously introduced into the high-temperature catalytic section, and a gas sampling bag connected to a gas outlet was opened to collect gas products. Four ice bath condenser tubes were provided at an outlet of the high-temperature catalytic section, so as to collect condensed liquid products, and then uncondensed gas passed through absorbent cotton and silica gel drying balls sequentially to be filtered and dried, and was finally collected by the gas sampling bag. After a reaction, a heating device was closed, and the condenser tubes before and after the reaction were weighed, a mass difference being a pyrolysis oil yield, and a result being 394.2 mg/g plastic.

No carbon nanotubes were generated, and separation and collection steps in Example 1 were not needed.

The collected gas products were quantitatively analyzed by a gas chromatography analyzer, and results indicated that a hydrogen yield reached 2.83 mmol/g plastic.

Comparative Example 2

Step one, raw material selection and pyrolysis section parameter settings were the same as those in Example 1.

Step two, five layers of 316 stainless steel sintered meshes having high temperature resistance were selected as a catalyst, and the catalyst was not subjected to any pretreatment. The meshed stainless steel catalyst was placed in the high-temperature catalytic section and heated to 800° C. The nitrogen carrier gas drove the plastic pyrolysis gas generated in the pyrolysis section to be continuously introduced into the high-temperature catalytic section, fully flow through a stainless steel mesh channel, and have a catalytic reaction on a surface of the mesh, so as to generate carbon nanotubes, and meanwhile, a gas sampling bag connected to a gas outlet was opened to collect gas products. Four ice bath condenser tubes were provided at an outlet of the high-temperature catalytic section, so as to collect condensed liquid products, and then uncondensed gas passed through absorbent cotton and silica gel drying balls sequentially to be filtered and dried, and was finally collected by the gas sampling bag. After 20 min of catalytic deposition, the reaction was finished, then gas collection and heating devices were closed, such that the catalyst and carbon nanotube products were naturally cooled to a room temperature. The condenser tubes before and after the reaction were weighed, a mass difference being a pyrolysis oil yield, and a result being 149.7 mg/g plastic.

Step three, a separation and collection method for carbon nanotubes was the same as that in Example 1. Results indicated that a yield of the carbon nanotubes was 109.8 mg/g plastic.

The collected gas products were quantitatively analyzed by a gas chromatography analyzer, and results indicated that a hydrogen yield reached 7.47 mmol/g plastic.

What is claimed is:

1. A meshed catalyst based high-yield preparation and regeneration method for carbon nanotubes and hydrogen, comprising the following steps:
   (a) conducting a pyrolysis reaction on waste plastic, heating to reach a set pyrolysis temperature, and continuously introducing nitrogen or inert gas as carrier gas, the plastic is subjected to the pyrolysis reaction to generate volatiles;
   (b) using a multilayer stainless steel mesh obtained through laminated pressing and vacuum sintering as a catalyst, introducing the volatiles into a catalytic section at a catalytic temperature, conducting a catalytic reaction under the action of a stainless steel mesh obtained through acid etching and calcination pretreatment, generating carbon nanotubes on a surface of the catalyst, and meanwhile generating hydrogen; wherein the multilayer stainless steel mesh catalyst is formed by conducting laminated pressing and vacuum sintering on five layers of stainless steel meshes, the five layers comprise a protective layer, a control layer, a flow dividing layer, and two reinforcing layers, the whole meshed stainless steel catalyst is designed as a cylinder having an outer diameter of 15 mm and a length of 10 cm, one side of the cylinder is open, and the other side of the cylinder is provided with a detachable stainless steel mesh bottom, the carbon nanotubes are capable of being conveniently separated from the catalyst in a subsequent ultrasonic process; and
   (c) after temperature drop, conducting ultrasonic treatment on the stainless steel mesh after the reaction in an ethanol solution, conducting suction filtration and collection on the carbon nanotubes dispersed in the ethanol solution, and meanwhile, conducting calcination on the stainless steel mesh from which the carbon nanotubes are stripped for recycling, regenerating the multilayer stainless steel mesh.

2. The meshed catalyst based high-yield preparation and regeneration method for carbon nanotubes and hydrogen according to claim 1, wherein in step (a), the waste plastic needs to be pulverized in advance, a particle size of waste plastic powder after pulverization is 30 meshes-200 meshes, and types of the plastic comprise low density polyethylene (LDPE), high density polyethylene (HDPE), polypropylene (PP), general-purpose polystyrene (GPPS), and high impact polystyrene (HIPS).

3. The meshed catalyst based high-yield preparation and regeneration method for carbon nanotubes and hydrogen according to claim 1, wherein in step (a), a pyrolysis heating rate of the waste plastic is 10° C./min-20° C./min, a final temperature range is 500° C.-600° C., holding time is 10 min-20 min, and a pyrolysis reactor is a fixed bed reactor.

4. The meshed catalyst based high-yield preparation and regeneration method for carbon nanotubes and hydrogen according to claim 1, wherein in step (b), a catalytic deposition temperature of the meshed stainless steel catalyst for growing the carbon nanotubes is 700° C.-900° C., and a catalytic reactor is a fixed bed reactor.

5. The meshed catalyst based high-yield preparation and regeneration method for carbon nanotubes and hydrogen according to claim 1, wherein a system uses one or more inert gases of nitrogen, helium and argon as the carrier gas, and a flow rate of the carrier gas is 50 mL/min-200 mL/min.

6. The meshed catalyst based high-yield preparation and regeneration method for carbon nanotubes and hydrogen according to claim 1, wherein in step (b), five layers of 304 or 316 stainless steel sintered meshes are used as the catalyst, and the stainless steel meshes are pretreated through acid etching or air calcination, such that a surface structure is formed.

7. The meshed catalyst based high-yield preparation and regeneration method for carbon nanotubes and hydrogen according to claim 1, wherein in step (c), ultrasonic frequency for separating the carbon nanotubes from the stainless steel mesh is 40 kHz-100 kHz, and ultrasonic treatment is conducted 5 times-10 times, each time lasting 10 min-30 min.

8. The meshed catalyst based high-yield preparation and regeneration method for carbon nanotubes and hydrogen according to claim 1, wherein in step (c), after the carbon nanotubes are separated from the stainless steel mesh, the stainless steel mesh is cleaned and dried for recycling.

* * * * *